United States Patent Office 3,629,297
Patented Dec. 21, 1971

3,629,297
SOLVENT-FREE LIQUID ORGANOSILICON
RESINS
Robert C. Antonen, Midland, Mich., assignor to
Dow Corning Corporation, Midland, Mich.
No Drawing. Filed Feb. 12, 1970, Ser. No. 11,032
Int. Cl. C08g 51/04, 31/02
U.S. Cl. 260—37 SB                9 Claims

ABSTRACT OF THE DISCLOSURE

A liquid resin consisting essentially of 55–80 mol percent of $CH_3SiO_{3/2}$ units, 10 to 30 mol percent of units selected from the group consisting of $CH_2=CHSiO_{3/2}$ and $CH_2=CH(CH_3)SiO$ and 10–35 mol percent of units selected from the groups consisting of $(C_6H_5)_2SiO$, $$C_6H_5(CH_3)SiO \text{ and } (CH_3)_2SiO$$

and having a silicon-bonded alkoxy content of from 5–20 weight percent, the alkoxy substituents having from 1 to 3 inclusive carbon atoms, are utilized as binders for ceramic formulations.

---

This invention relates to solvent-free liquid organosilicon resins. In one aspect, the invention relates to a superior binder resin for ceramic formulations. In another asspect, the invention relates to high strength ceramic materials.

Siloxane molding and coating compositions, including organosilicon resins admixed with filters, are well known. Organopolysiloxanes having a degree of substitution (R/Si ratio) of from 0.9 to 1.9 are generally classed as resins. A variety of organosilicon resins have been used as binders for ceramic materials. These ceramic materials are a mixture of the binder resin and volatile-free fillers, such as alumina or silicon carbide, which when fired at high temperatures (above 500° C.) give a strong coherent mass having dimensional stability and chemical inertness. Although not necessary, the firing of the mixture can result in a phase change of certain filler components, either by vitrification, sintering or chemical reaction.

Certain organosilicon resins, such as phenylmethylpolysiloxane having a degree of substitution of 1.15 and a phenyl to methyl ratio of 1.13/1.0 are solid materials. Such solid granular resins are difficult to mix with the filler components of a ceramic material. Additionally, it is difficult to fabricate the unfired material to obtain a useful article. Generally the "green" or unfired ceramic must be press molded to obtain a suitable article.

Liquid resins have been suggested for use in ceramic formulations—see U.S. Pat. 3,090,691. The use of a liquid resin as a binder in ceramic formulations is especially attractive because such formulations are easily processed and fabricated. The suggested liquid resins are unsatisfactory in certain applications because the formulations based on such resins lack green strength, requiring a relatively long molding cycle and firing time, and the fired parts often crack during ceramification.

The liquid organosilicon resins of the present invention function as improved binders in ceramic formulations. The ceramic materials based on these resins are easily processed and fabricated and show improved strength in both the unfired and fired state.

Thus, it is an object of the invention to provide novel liquid organosilicon resins.

It is another object of the invention to provide a high strength ceramic material.

These and other objects of the invention will be apparent to one skilled in the art upon consideration of the following disclosure.

According to the invention, there is provided a solvent-free liquid organosilicon composition consisting of (a) 55 to 80 mol percent $CH_3SiO_{3/2}$ units, (b) 10 to 30 mol percent of units selected from the group consisting of $CH_2=CHSiO_{3/2}$ and $CH_2=CH(CH_3)SiO$ and 10 to 35 mol percent of units selected from the group consisting of $(C_6H_5)_2SiO$, $C_6H_5(CH_3)SiO$ and $(CH_3)_2SiO$; the composition having a silicon-bonded alkoxy content of from about 5 to 20 weight percent, based on the weight of the composition, the alkoxy substituents having from 1 to 3 inclusive carbon atoms.

The above-described copolymeric resins are best prepared by cohydrolysis of the corresponding alkoxy silanes. The cohydrolysis can be carried out by conventional techniques using acidified water, except that only from 80 to 95 percent of the thoretical amount of water for complete hydrolysis is added. This partial hydrolysis of alkoxy silanes gives a product having the defined silicon-bonded alkoxy content. The residual alkoxy content is necessary in this particular resin to provide a liquid.

The monomethylsiloxane (a) and the substituents of group (c), the diphenylsiloxane, the phenylmethylsiloxane, and dimethylsiloxane, are necessary to the resin formulation in order to give strength when the resin is used as a binder in ceramic materials. The proportion of monomethyl to diorgano substituents (c) is believed to provide a liquid having an orderly decomposition of the organic groups, thus allowing the volatiles to escape from the ceramic formulation over a wide temperature range during firing. It is hypothesized that it is this orderly decomposition that permits firing of crack-free ceramic articles in a relatively short time.

The monovinylsiloxane or methylvinylsiloxane units (b) are present in the resin to provide the cross-linking sites necessary for curing the composition to a solid. When used as a binder for ceramics, the resin, of course, is cured after processing and fabricating of the ceramic article. The resin is cured by heating in the presence of organic peroxide, whereby there is cross-linking via the vinyl groups. The amount of peroxide in the resin is not critical, but generally 0.1 to 10 weight percent, based on the weight of the resin, is used. Typical of suitable organic peroxide catalysts are acetylperoxide, tertbutylperbenzoate, benzoylperoxide tertbutylhydroperoxide, tertbutylperacetate, dicumylperoxide and p-tertbutylisopropylbenzenehydroperoxide. Tertbutylperbenzoate, dicumylperoxide and 2,5-dimethyl-2,5 bis (t-butylperoxy) hexane are preferred catalysts. The curing temperature and time necessary to obtain a complete cure will depend on the degree of activity of the peroxide, the amount of catalyst present, and the amount of vinyl groups in the resin. Thus, curing conditions can vary widely with temperatures of 300° F. or greater being in general use.

A preferred embodiment of the resin consists essentially of an organosilicon composition having from 65 to 75 mol percent $CH_3SiO_{3/2}$ units, 15 to 25 mol percent of $$CH_2=CHSiO_{3/2} \text{ or } CH_2=CH(CH_3)SiO$$

units and 10 to 20 mol percent of $(C_6H_5)_2SiO$, $C_6H_5(CH_3)SiO$ or $(CH_3)_2SiO$ units.

When used as ceramic binders, the liquid resins are high viscosity fluids of from 5,000 to 500,000 cs. (centistokes) when measured at 25° C., with viscosities in the range of 10,000 to 50,000 cs. being preferred. Although these resins have been described as binders for ceramic materials, their use is not so limited. The resins of the invention can also be used as casting and molding resins and as electrical varnishes and protective coatings for metals.

Further in accordance with the invention, there is provided a heat-curable composition consisting essentially of a mixture of (1) 10 to 20 percent by weight of a liquid organosilicon resin consisting essentially of (a) 55 to 80 mol percent of $CH_3SiO_{3/2}$ units, (b) 15 to 30 mol percent selected from the group consisting of $CH_2{=}CHSiO_{3/2}$ and $CH_2{=}CH(CH_3)SiO$ and (c) 5 to 20 mol percent of units selected from the groups consisting of $(C_6H_5)_2SiO$, $C_6H_5(CH_3)SiO$ and $(CH_3)_2SiO$, the composition having a silicon-bonded alkoxy content of from 5 to 20 weight percent, based on the weight of composition, the alkoxy substituents having from 1 to 3 inclusive carbon atoms, and from 0.1 to 10 weight percent, based on the weight of resin of an organic peroxide curing catalyst; and (2) from 80 to 90 percent by weight of a volatile-free filler selected from the group consisting of magnesium silicate, aluminum silicate, silica, magnesium oxide, alumina, zinc oxide, zirconium silicate, silicon carbide, silicon nitride, and thorium oxide.

The term "volatile-free" means that the filler is free of volatile materials, such as water (either in the form of absorbed water or in the form of hydroxyl groups) and other materials which give off volatiles upon heating, such as carbonates or organic materials. These volatile fillers can be prepared by calcining the materials at temperatures above 500° C., which gives an anhydrous product and decomposes carbonates. The crystalline structure of the filler is not critical and the material can be synthetic or of natural origin. The filler can be in the form of fibers or particles. The particle size is not critical although finely divided powdered materials are preferred. It is within the scope of the invention to utilize any combination of the defined fillers.

While the heat-curable compositions of the invention consist essentially of the defined resins and fillers, it is understood that the composition can contain small amounts of additives such as mold release agents, stabilizers and pigments, such as ferric oxide and the like. These curable compositions can be utilized as conventional molding compounds. In their uncured state, the compositions are of a paste or putty-like consistency and can be easily molded or extruded. Upon heating and curing the resin, a rigid article is obtained which can be employed in environments below 300° C.

Another aspect of the present invention relates to a method of producing ceramic articles comprising forming the above-described uncured molding composition into the shape of a desired product or article, at least partially curing the organosilicon component of the article to a degree of cure which imparts sufficient strength so that the article maintains its shape during firing and thereafter subjecting the at least partially cured product to a temperature in the range of from 500 to 2000° C. until a ceramic article is obtained.

The shaping of the uncured molding composition can be accomplished by a variety of conventional techniques. For example, transfer or injection molding can be used to produce complicated shapes. Elongated objects can be formed by extrusion of the molding composition. Composite articles can be fabricated by spreading the uncured material over a suitable substrate.

In some instances, the uncured material will slump during the initial phase of firing. To avoid this, the organosilicon component is partially or completely cured prior to firing. The degree of curing necessary to avoid slumping is dependent on the shape of the article. For example, parts having an intricate shape in which close tolerances must be maintained are fully cured before firing. The curing temperature is generally above 150° C. and the duration of the curing step is dependent upon the degree of cure desired, the amount and nature of the catalyst and the amount of vinyl substituents in the resin. In any event, the formed article is cured to a degree sufficient to give it the necessary strength to avoid loss of shape during firing.

It is necessary for the production of a ceramic article that the at least partially cured molding composition be heated to a temperature of 500° C. or above. It is believed that the 500° C. temperature is necessary to provide an effective decomposition rate of the organosilicon resin. The heating of the molding compound at the ceramification temperature is generally continued until no further weight loss is observed. This duration of heating will vary depending upon the temperature, the specific resin formulation and the amount of resin in the molding compound. Weight loss generally ceases after from 2 to 24 hours at from 500 to 2000° C.

The fired ceramic article obtained by this method is a non-metallic, inorganic, water-insoluble coherent mass having a softening or decomposition point of above 800° C. The articles are of exceptionally high strength, often showing flexural strengths in excess of 20,000 p.s.i. The ceramic materials thus formed have particular utility as leachable cores in the investment casting of metal parts.

The following examples are illustrative of the invention, which is properly delineated in the claims.

EXAMPLE 1

A three-necked five-liter flask equipped with a dropping funnel, thermometer and agitator was charged with 476 grams of $CH_3Si(OCH_3)_3$, 148 grams of

$CH_2{=}CHSi(OCH_3)_3$ and 122 grams of $(C_6H_5)_2Si(OCH_3)_2$. While stirring, a mixture of 114 grams of water (90% of the theoretical amount for complete hydrolysis) and 6.4 grams of hydrochloric acid was added to the methoxy silanes. The hydrolyzate mixture was refluxed for 2 hours. The mixture was then neutralized by the addition of 5.4 grams of $NaHCO_3$ and 350 grams of toluene. The hydrolyzate was washed with water. After separation of the aqueous layer, the hydrolyzate was stripped of volatiles at 150° C./40 mm. Hg.

The hydrolysis reaction was essentially quantitative, giving a high viscosity resin consisting of 70 mol percent monomethylsiloxy units, 20 mol percent of vinyl siloxy units and 10 mol percent diphenylsiloxy units and having a methoxy content of 9.8 weight percent.

EXAMPLE 2

The apparatus described in Example 1 was charged with 748 grams of $CH_3Si(OCH_3)_3$, 148 grams of

$CH_2{=}CHSi(OCH_3)_3$ 240 grams of $(CH_3)_2Si(OCH_3)_2$ and 244 grams of $(C_6H_5)_2Si(OCH_3)_2$. While stirring, 219 grams of acidified water (0.2 percent acetic acid) was added and the hydrolyzate was refluxed. After neutralization by the addition of $NaHCO_3$, toluene was added. The hydrolyzate was stripped of volatiles. The hydrolysis product, 60 mol percent monomethylsiloxy units, 10 mol percent monovinylsiloxy units, 20 mol percent dimethylsiloxy units and 10 mol percent diphenylsiloxy units, was a low viscosity liquid (298 cs.) having a silicon-bonded methoxy content of 16.1 weight percent.

EXAMPLE 3

Utilizing the above described procedure the following resins were produced;

(1) A liquid organosilicon resin having a silicon-bonded methoxy content of 16 weight percent and consisting essentially of 55 mol percent monomethylsiloxy units, 10 mol percent monovinylsiloxy units, 25 mol percent dimethylsiloxy units and 10 mol percent diphenylsiloxy units.

(2) Hydrolysis of 816 grams of $CH_3Si(OCH_3)_3$, 480 grams of $(CH_3)(CH_2{=}CH)Si(OC_2H_5)_2$ and 244 grams of $(C_6H_5)_2Si(OCH_3)_2$ by the addition of 90 percent of the theoretical amount of water produced a liquid resin having a viscosity of 2850 cs. which consisted essentially of 60 mol percent monomethylsiloxy units, 30 mol percent methylvinylsiloxy units and 10 mol percent of diphenylsiloxy units having an alkoxy content (methoxy and ethoxy) of about 10 weight percent.

to 650° F./12 hours to 1000° F./18 hours to 2750° F./ hold at 2750° F. for 1 hour).

The flexural strength of all of the fired specimens was determined. All flex strengths were determined at room temperature and the values reported below represent the average of three such determinations.

PHYSICAL PROPERTIES

| Molding composition number | Mold cycle (min.) | Flex (p.s.i.) | As molded Sample condition | Post cure Hours | Flex (p.s.i.) | Firing Number— 1, flex (p.s.i.) | 2, flex (p.s.i.) | 3, flex (p.s.i.) |
|---|---|---|---|---|---|---|---|---|
| 1 | 5 | | Coherent | 4 | 5,710 | 8,240 | 27,900 | 22,500 |
| 2 | 5 | | do | 4 | 6,440 | 7,430 | 25,600 | 9,010 |
| 3 | 30 | 850 | Poor consolidation, small pores, excess resin bleed. | 2 | 1,200 | 1,070 | 9,150 | 8,620 |
| 4 | 10 | 1,300 | Soft, voids, warped | 2 | 1,885 | 2,410 | 9,480 | 10,950 |

EXAMPLE 4

A first molding compound consisting of 12 weight percent of the resin of Example 1, containing 2 weight percent, based on the weight of resin, of 2,5-dimethyl-2,5 bis (t-butylperoxy) hexane (50% active catalyst on an inert filler); 87 weight percent of alumina (−325 mesh) and 1 weight percent of calcium stearate (release agent) was prepared by mixing the component on a two roll mill at room temperature. The resulting compound had the consistency of firm putty. Bar specimens (5″ x ½″ x ¼″) of the compound were prepared by transfer molding using a ten-ton press. High flow and good moldability were observed during the transfer molding.

A second molding compound identical to the above-described material, except that a different resin was used, was prepared and fabricated into bars in the same manner. The resin binder for this molding compound consisted of 70 mol percent monomethylsiloxy units, 15 mol percent monovinylsiloxy units, and 15 mol percent phenylmethylsiloxy units, having 10.3 weight percent methoxy substituents and contained 2 weight percent of the 2,5-dimethyl-2,5 bis (t-butyl) hexane catalyst.

As a comparison with prior art liquid resins, a copolymer consisting of 50 mol percent phenylvinylsiloxy units and 50 mol percent phenylmethylsiloxy units was prepared. This resin contained about 2–3 weight percent silicon-bonded hydroxyl groups and was free of alkoxy substituents. Molding composition No. 3 consisted of 12 weight percent of this resin, containing 3 weight percent of the previously described catalyst 87 weight percent of the alumina filler and 1 weight percent of calcium stearate.

As a further comparison, a liquid resin consisting of 60 mol percent phenylmethylsiloxy units, 35 mol percent phenylvinylsiloxy units and 5 mol percent phenylmethylvinylsiloxy units was prepared. Molding composition No. 4 consisted of 12 weight percent of this resin, containing 3 weight percent of the described catalyst, 87 weight percent of the alumina filler and 1 weight percent calcium stearate.

The bars were molded at 350° F. and the molding time was sufficient to allow curing of the resin to a degree which would permit removal of the bars from the mold. Observations of the "as molded" bars were made as to cure, warpage, surface blemishes and consolidation. After molding and partial curing the bars were post-cured for 2–4 hours at 200° C.

Bar specimens of each molding composition were fired according to each of the following schedules:

Schedule No. 1—presintering 87 hours to 950° F. (22 hours to 700° F./64 hours to 950° F./hold at 950° F. for one hour)

Schedule No. 2—same as Schedule No. 1, cool to room temperature, plus 32 hours to 2750° F. (6 hours to 650° F./12 hours to 1000° F./18 hours to 2750° F./ hold at 2750° F. for 1 hour)

Schedule No. 3—fast firing, 32 hours to 2750° F. (6 hours

That which is claimed is:

1. A solvent-free liquid organosilicon composition consisting essentially of:
   (a) 55 to 80 mol percent $CH_3SiO_{3/2}$ units,
   (b) 10 to 30 mol percent of units selected from the group consisting of $CH_2{=}CHSiO_{3/2}$ and $$CH_2{=}CH(CH_3)SiO$$

and
   (c) 10 to 35 mol percent of units selected from the group consisting of $(C_6H_5)_2SiO$, $C_6H_5(CH_3)SiO$ and $(CH_3)_2SiO$, said composition having a silicon-bonded alkoxy content of from 5 to 20 weight percent, based on the weight of composition, the alkoxy substituents having from 1 to 3 inclusive carbon atoms.

2. The composition of claim 1 wherein said silicon-bonded alkoxy substituents are methoxy radicals.

3. The composition of claim 1 including from 0.1 to 10 percent by weight based on the weight of organo-silicon compositions of an organic peroxide curing catalyst for said composition.

4. The composition of claim 3 wherein the catalyst is dicumyl peroxide.

5. The composition of claim 3 wherein the catalyst is 2,5-dimethyl-2,5 bis (t-butylperoxy) hexane.

6. The cured composition of claim 3.

7. A composition in accordance with claim 1 consisting essentially of:
   (a) 65–75 mol percent $CH_3SiO_{3/2}$ units;
   (b) 15–25 mol percent of units selected from the group consisting of $CH_2{=}CHSiO_{3/2}$ and $$CH_2{=}CH(CH_3)SiO$$

and
   (c) 10 to 20 mol percent of units selected from the group consisting of $(C_6H_5)_2SiO$, $C_6H_5(CH_3)SiO$ and $(CH_3)_2SiO$.

8. A heat-curable composition consisting essentially of
   (a) 10 to 20 percent by weight of the organosilicon composition of claim 3,
   (b) 80 to 90 percent by weight of a volatile-free filler selected from the group consisting of magnesium oxide, alumina, zinc oxide, zirconium silicate, silicon carbide, silicon nitride, and thorium oxide.

9. A method of producing ceramic products comprising the steps of:
   (a) mixing (1) organosilicon composition consisting essentially of (a) 55 to 80 mol percent $CH_3SiO_{3/2}$ units, (b) 10 to 30 mol percent of units selected from the groups consisting of $CH_2{=}CHSiO_{3/2}$ and $CH_2{=}CH(CH_3)SiO$, and 10 to 35 mol percent of units selected from the group consisting of $(C_6H_5)_2SiO$, $C_6H_5(CH_3)SiO$ and $(CH_3)_2SiO$, said composition having a silicon-bonded alkoxy content of from 5 to 20 weight percent based on the weight of the composition, the alkoxy substituents having from 1 to 3 inclusive carbon atoms, said composition further containing from 0.1 to 10 weight percent of an organic peroxide curing catalyst and (2) a volatile-free anhydrous filler selected from the group consisting of magnesium silicate, aluminum silicate, silica, magnesium oxide, alumina, zinc oxide, zirconium silicate, silicon carbide, silicon nitride and thorium oxide to obtain a molding composition consisting essentially of 10 to 20 weight percent of (1) and 80 to 90 weight percent of (2);

(b) forming said molding composition into a product shape;

(c) curing, at least partially, the organosilicon component of the shaped product; and (d) subjecting the at least partially cured product to a temperature in the range of 500 to 2000° C. until a ceramic article is obtained.

References Cited

UNITED STATES PATENTS

| | | | |
|---|---|---|---|
| 2,714,099 | 7/1955 | Weyenberg | 260—46.5 UA |
| 2,894,930 | 7/1959 | Clark | 260—46.5 UA X |
| 3,183,209 | 5/1965 | Hartung et al. | 260—46.5 UA |

FOREIGN PATENTS

| | | | |
|---|---|---|---|
| 1,155,250 | 10/1963 | Germany | 260—46.5 UA |

MORRIS LIEBMAN, Primary Examiner

L. T. JACOBS, Assistant Examiner

U.S. Cl. X.R.

106—44; 260—46.5 UA